United States Patent
Kolstee et al.

(10) Patent No.: US 7,572,043 B2
(45) Date of Patent: Aug. 11, 2009

(54) ANTI-THEFT VEHICLE MINI LAMP

(75) Inventors: Todd Kolstee, North Clymer, NY (US); Timothy A. DiPenti, Russell, PA (US); Gary R. Johnson, Lakewood, NY (US)

(73) Assignee: Truck-Lite Co., Inc., Flaconer, NY (US)

( * ) Notice: Subject to any disclaimer, the term of this patent is extended or adjusted under 35 U.S.C. 154(b) by 0 days.

(21) Appl. No.: 11/983,667

(22) Filed: Nov. 9, 2007

(65) Prior Publication Data

US 2008/0062708 A1    Mar. 13, 2008

Related U.S. Application Data

(63) Continuation-in-part of application No. 11/077,919, filed on Mar. 10, 2005.

(60) Provisional application No. 60/552,123, filed on Mar. 10, 2004.

(51) Int. Cl.
*B60Q 1/26* (2006.01)

(52) U.S. Cl. .................. 362/540; 362/545; 362/548

(58) Field of Classification Search .............. 362/353, 362/365, 368, 396, 455, 470, 473, 477, 478, 362/479, 481, 487, 495–497, 505, 506, 523, 362/485, 540, 543, 545, 546, 548, 549, 655, 362/800
See application file for complete search history.

(56) References Cited

U.S. PATENT DOCUMENTS

| | | | | |
|---|---|---|---|---|
| 5,632,551 | A * | 5/1997 | Roney et al. | 362/485 |
| 5,839,231 | A | 11/1998 | Gebhart et al. | |
| 5,860,726 | A | 1/1999 | Richardson | |
| 6,244,736 | B1 * | 6/2001 | O'Neal | 362/549 |
| 6,502,975 | B1 * | 1/2003 | Branstetter | 362/549 |
| 6,897,380 | B2 | 5/2005 | Sakata et al. | |
| 2003/0151925 | A1 * | 8/2003 | Crunk | 362/545 |

* cited by examiner

*Primary Examiner*—Hargobind S Sawhney
(74) *Attorney, Agent, or Firm*—Byron A. Bilicki, Esq.; Carl A. Hjort, III; The Bilicki Law Firm, PC (57) ABSTRACT

A vehicle lamp assembly includes a housing having a top end, a body portion with an interior portion, and a lens portion covering the top end. The lamp assembly also includes an attachment member having a sleeve portion with an open top end and an open bottom end. The sleeve portion includes a recess and is adapted to receive the body of the housing and to fit within an opening in a vehicle surface such that the lens portion of the housing is substantially flush with an outer face of the vehicle surface and the body portion of the housing is positioned substantially behind the surface. A securing device is positioned between a back face of the vehicle surface and a plurality of legs from the attachment member, wherein the securing device prevents the attachment member and housing from being removed from the vehicle surface.

20 Claims, 12 Drawing Sheets

ANTI-THEFT VEHICLE MINI LAMP

CROSS-REFERENCE TO RELATED APPLICATIONS

This application is a continuation-in-part of U.S. patent application Ser. No. 11/077,919, filed Mar. 10, 2005, which claims the benefit of and priority to U.S. provisional application No. 60/552,123 filed Mar. 10, 2004, incorporated herein in its entirety.

FIELD OF THE INVENTION

The subject invention relates generally to vehicular lights. More particularly, the invention relates to an anti-theft vehicle lamp assembly and method for assembling an anti-theft vehicle lamp assembly.

DETAILED DESCRIPTION OF THE EMBODIMENTS OF THE INVENTION

For the purpose of promoting an understanding of the present invention, references are made in the text hereof to embodiments of a vehicle mini lamp and assembly, only some of which are illustrated in the drawings. It is nevertheless understood that no limitations to the scope of the invention are thereby intended. One of ordinary skill in the art will readily appreciate that modifications such as the shape and materials of the components, the positioning of the components, the color of the LED or lens, and the number of vehicle mini lamps do not depart from the spirit and scope of the present invention. Some of these possible modifications are mentioned in the following description. Furthermore, in the embodiments depicted, like reference numerals refer to identical structural elements in the various drawings.

The embodiments of the subject invention that are disclosed herein are designed to satisfy the Society of Automotive Engineers (SAE) Standards. SAE Standards J592e (7/72) and J592 (8/00) specify certain photometric requirements, including luminous intensity requirements, for side marker lamps; SAE Standards J2042 (6/96), J2042 (3/00), and J2042 (3/03) specify certain photometric requirements for clearance, side marker, and identification lamps; SAE Standard J578c (2/77) specifies certain chromaticity requirements for color. All of these SAE Standards are all met by the vehicle mini lamp as disclosed herein.

The Department of Transportation (DOT), in its Federal Motor Vehicle Safety Standards, 49 C.F.R. §571.108 (2000), or "FMVSS 108," regulates all lamps, reflective devices, and associated equipment. FMVSS 108 can be found at www.nhtsa.dot.gov and is hereby incorporated by reference in its entirety. DOT Standard 1383 (part of FMVSS108) adopts the Society of Automotive Engineers (SAE) Standard J592 (July 1972 and August 2000), J2042 (September 1996, March 2000, and March 2003, and J578 (February 1977) for motor vehicle clearance, side marker, and identification lamps.

SAE Standard J592, paragraph 3.1 defines a "clearance lamp" as a lamp "mounted on the permanent structure of the vehicle as near as practicable to the upper left and right extreme edges that provide light to the front or rear to indicate the overall width and height of the vehicle." SAE Standard J592, paragraph 3.2 further defines a "side marker lamp" as a lamp that is "mounted on the permanent structure of the vehicle as near as practicable to the front and rear edges, that provide light to the side to indicate the overall length of the vehicle." SAE Standard J592, paragraph 3.3 defines "combination clearance and side marker lamps" as "single lamps which simultaneously fulfill performance requirements of clearance and side marker lamps." SAE Standard J592, paragraph 3.4 defines an "identification lamp" as "lamps used in groups of three, in a horizontal row, that provide light to the front or rear or both, having lamp centers that are spaced not less than 150 mm nor more than 310 mm apart, mounted on the permanent structure as near as practicable to the vertical centerline and the top of the vehicle to identify vehicles 2032 mm or more in overall width." Unless otherwise noted, the SAE definitions of these terms are adopted and used herein. The lamp of the instant application is intended to be used in any or all of these applications. The various embodiments discussed infra will satisfy all SAE standards for photometric requirements as well as chromaticity.

SAE Standard J592 also specifies certain minimum and/or maximum luminous intensity requirements for vehicular lamps functioning as clearance, side marker, and identification lamps. According to the aforementioned standards, a minimum luminous intensity must exist at various points in the illumination zone to be in compliance. These specific photometric requirements for clearance, side marker, and identification lamps, as set forth in SAE Standard J592, are included herein below.

1TABLE 1 PHOTOMETRIC REQUIREMENTS Test Points[1,2] Minimum Luminous Minimum Luminous Zone (in degrees) Intensity (cd), Red[3,4] Intensity (cd), Yellow[3,4] 1 45L-10U 0.75 1.86 45L-H 45L-10D 2 V-10U 0.75 1.86 V-H V-10D 3 45R-10U 0.75 1.86 45R-H 45R-10D [1]Maximum luminous intensities of red clearance and identification lamps shall not exceed 18 cd within the solid cone angle 45L to 45R # and 10U to 10D. When red clearance lamps are optically combined with stop or turn signal lamps, the maximum applies only on or above horizontal. # The maximum luminous intensity shall not be exceeded over any area larger than that generated by a 0.5 degree radius within the solid cone angle prescribed by the test points. [2]The requirements for side markers used on vehicles less than 2032 mm wide need only be met for inboard test points at a distance of 4.6 m # from the vehicle on a vertical plane that is perpendicular to the longitudinal axis of the vehicle and located midway between the front and rear side marker lamps. [3]When calculating zone totals, the measured value at each test point shall not be less than 60% of the minimum values in Table 2. [4]Combination clearance and side marker lamps shall conform with both clearance and side marker photometric performance requirements.

2TABLE 2 PHOTOMETRIC DESIGN GUIDELINES Test Points Minimum Luminous Minimum Luminous (in degrees) Intensity (cd), Red[1,2] Intensity (cd), Yellow[2] 10U 45L 0.25 0.62 V 0.25 0.62 45R 0.25 0.62 H 45L 0.25 0.62 V 0.25 0.62 45R 0.25 0.62 10D 45L 0.25 0.62 V 0.25 0.62 45R 0.25 0.62 [1]The maximum design value of a lamp intended for the rear of the vehicle should not exceed the listed design maximum over any area larger than that generated # by 0.25 degree radius within the solid angle defined by the test points in Table 2. [2]For combined clearance and side marker lamps, both the clearance and side marker photometric design values should apply.

SAE Standard J592, paragraph 6.1.7 also requires that the color of the emanating light produced by a front clearance lamp, front and intermediate side marker lamps, and front identification lamp be yellow, and that rear clearance lamps, side marker lamps, and identification lamps shall be red, both as specified in SAE Standard J578. SAE J578, entitled "Color Specification," sets forth the fundamental requirements for color, expressed as chromaticity coordinates according to the CIE (1931) standard colorimetric system. Pursuant to SAE J578, paragraphs 3.1.1 and 3.1.2, respectively, the following requirements for red and yellow amber light shall apply when measured by the tristimulus or spectrophotometric methods, as are well-known in the art.

3TABLE 3 RED LIGHT The color of light emitted from the device shall fall within the following boundaries: y=0.33 (yellow boundary) y=0.98−x (purple boundary)

4TABLE 4 YELLOW AMBER LIGHT The color of light emitted from the device shall fall within the following boundaries: y=0.39 (red boundary) y=0.79−0.67x (white boundary) y=x−0.12 (green boundary)

SAE J592 standard and SAE J578 standard can also be found at www.sae.com and are hereby incorporated by reference in their entireties, as is FMVSS 108, 49 C.F.R. §571.108 (2000).

In addition, it is intended that the lamps of the present invention could also be used on mirrors, cabs, cars, and other non-trailer applications. Moreover, the lamps can be used on other types of vehicles, including but limited to watercraft, motorcycles, and the like, whether or not specific SAE or FMVSS photometric standards apply.

Figure 1:
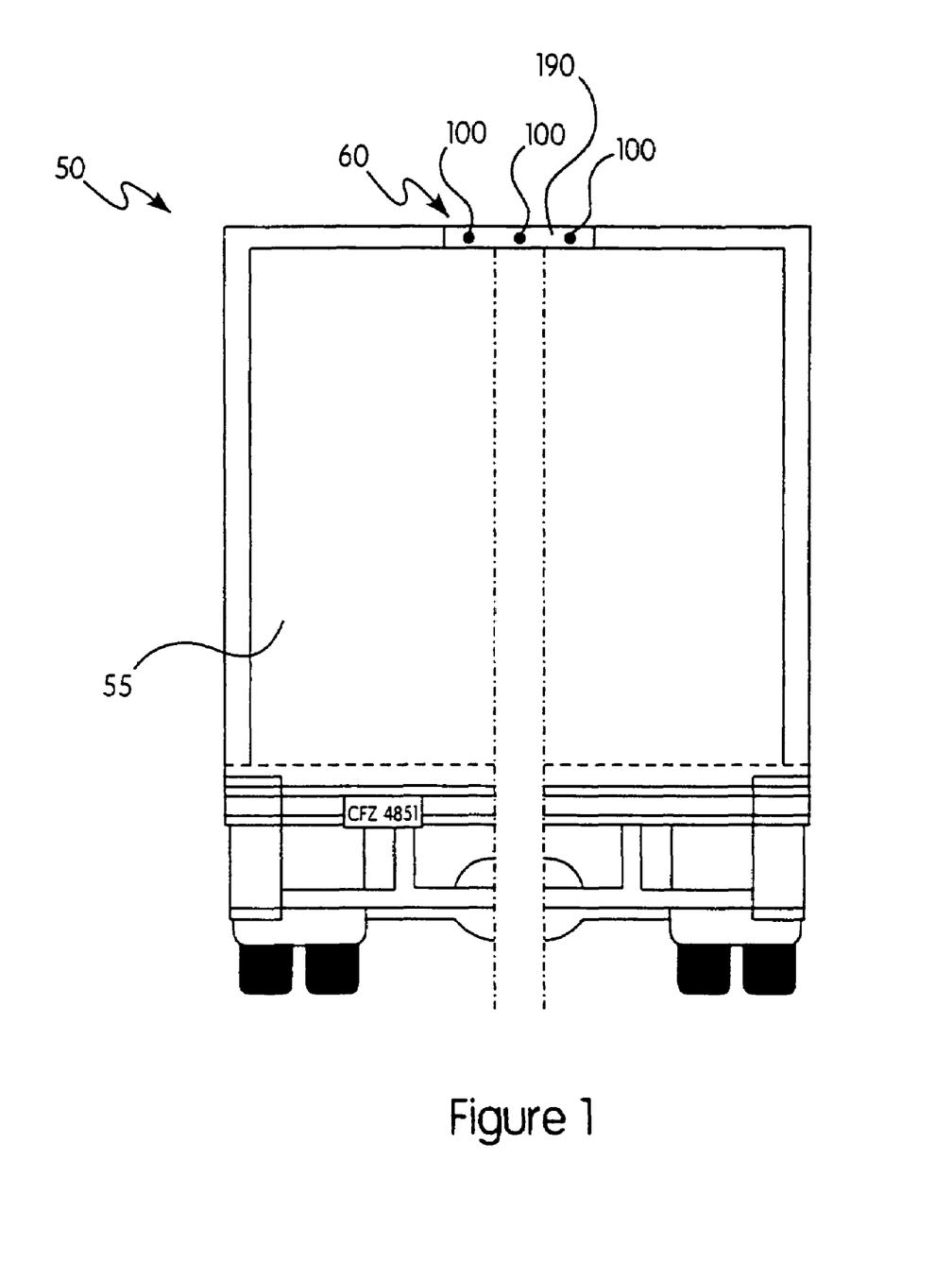
FIG. 1 is back view of a typical vehicle in which the positioning of a plurality of one embodiment of the vehicle mini lamps can be seen.

FIG. 1 is back view of a typical vehicle 50 in which the positioning of a plurality of one embodiment of vehicle mini lamp 100, being used as identification lamp assembly 60, can be seen. In the embodiment shown, there are three vehicle mini lamps 100 generally centered and along the top of back end 55 of vehicle 50. However, this is not intended to be limiting, as provided and described in detail infra.

Figure 2:
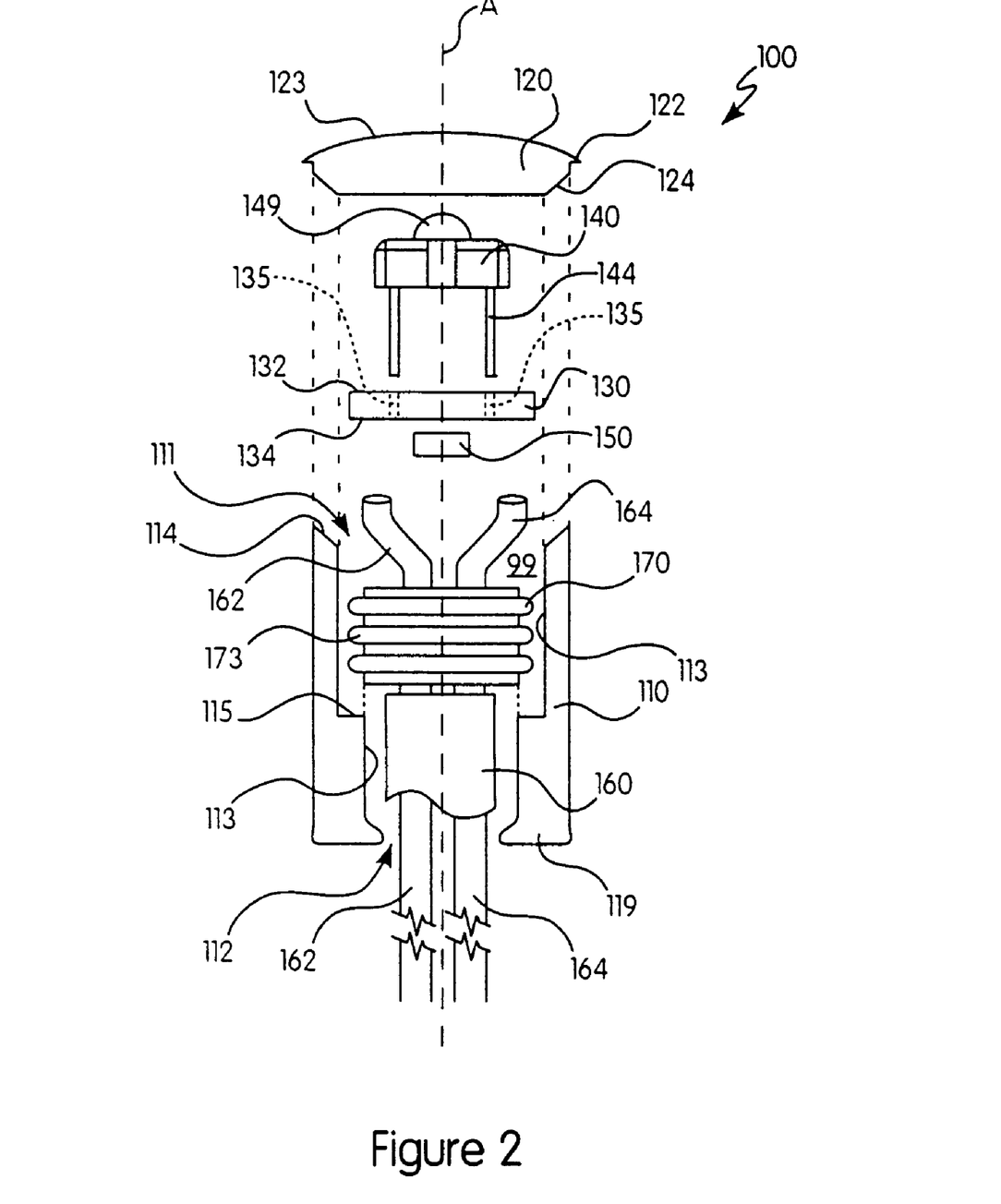
FIG. 2 is an exploded view of the vehicle mini lamp according to one embodiment of the present invention.

FIG. 2 shows an exploded view of one embodiment of one vehicle mini lamp 100, which, in the embodiment shown, is comprised of housing 110, lens 120, and circuit board 130, all generally cylindrical about axis A, as well as LED 140, resistor 150, cable 160, cable wires 162, 164, and cable seal 170. One of ordinary skill in the art will recognize, however, that multiple LEDs can be used instead of the single LED 140 shown.

In the embodiment shown in FIG. 2, housing 110 is generally cylindrical about axis A, with two ends, a top end 111 and a lower end 112. Lower end 112 allows cable 160 and cable wires 162, 164 to enter housing 110, and top end 111 allows the components to be assembled outside of housing 110 before being sealed within housing 110, as discussed in greater detail infra. In the embodiment shown, an interior portion 115 is also visible. Housing 110 is comprised of interior portion 115 such as a ledge so that circuit board 130 rests atop it when assembled, properly positioning the various elements within housing 110.

In an alternate embodiment, a body portion 113 of housing 110 is tapered such that top end 111 is of a greater diameter than lower end 112. The tapering of body portion 113 of housing 110 allows for a snug fit between circuit board 130 and housing 110 as circuit board 130 is positioned within housing 110, creating a junction between the two components.

Also visible on housing 110 is top surface 114. Top surface 114, in one embodiment, is angled to receive corresponding bottom surface 124 of lens 120. Lens 120 is then attached to housing 110 by use of a glue, adhesive, or epoxy between bottom surface of lens 120 and top surface 114 of housing 110, forming cavity 99 within housing 110. In an alternate embodiment, top surface 114 of housing 110 and bottom surface 124 of lens 120 are horizontally flat and secured to one another. In yet another embodiment, the shape of top surface 114 of housing is configured such that lens 120 snaps into housing 110, securing lens 120 to housing 110. Lens 120 and housing 110 can also be connected to one other via high frequency welding, hot gas welding, ultrasonic welding, hot plate welding, or vibration welding. Lens 120 could also be attached to housing 110 via a fastener such as a snap-ring, a screw, or a rivet, or both could be threaded such that lens 120 threadedly engages housing 110. Glue or an O-ring can further be used at the junction between housing 110 and lens 120 to further produce a liquid and air-tight junction. In a further embodiment, lens 120 is integrally formed with housing 110.

In the embodiment shown in FIG. 2, lens 120 is made of polycarbonate plastic, but could also be made of acrylic, glass, or any other material that is sufficiently durable and satisfies the requirements set forth in SAE J576 (7/91), "Plastic Materials for Use in Optical Parts Such as Lenses and Reflectors of Motor Vehicle Lighting Devices." Housing 110 is also made of polycarbonate plastic in the embodiment shown in FIG. 2, but could also be made of acrylic or any other durable material that is compatible with the material chosen for lens 120. The adhesive chosen to adhere lens 120 to housing 110 must be compatible with the materials chosen for lens 120 and housing 110. For example, the embodiment shown in FIG. 2 uses a polycarbonate housing and a polycarbonate lens 120.

As stated supra, lens 120 is adapted to meet with housing 110, forming cavity 99, within which the other components of vehicle mini lamp 100 are situated. As can be seen in FIG. 2, in one embodiment, lens 120 has a generally arcuate top surface 123. Top surface 123 need not be arcuate, but the shape shown in FIG. 2 aids in maintaining a low profile of vehicle mini lamp 100 when mounted to a mounting structure (not shown). In the embodiment shown, lens 120 is further comprised of lip 122 so that when lens 120 is secured to housing 110, lip 122 is generally flush with an attachment member (not shown, but discussed infra) or the mounting structure. In an alternate embodiment, lens 120 does not include lip 122, but is still generally flush with the attachment member or surface of the mounting structure. In the embodiment in which top surface 123 of lens 120 is not arcuate, but flat, top surface 123 of housing 120 is still generally flush with the attachment member.

Also visible in FIG. 2 is circuit board 130, which, when the embodiment shown of vehicle mini lamp 100 is assembled, is positioned atop ledge 115. One embodiment of circuit board 130 is made of an epoxy fiberglass material, with copper clad on both top surface 132 and bottom surface 134. The copper clad is etched away, leaving copper traces behind which act as the electrical circuitry between the various electrical components mounted to circuit board 130, i.e., LED 140, resistor 150, and cable wires 162 and 164, as well as any other electrical components that may be added, such as circuit protection. In an alternate embodiment, circuit board 130 is a metalcord board comprised of a base metal layer, a dielectric layer, and a copper layer. Also visible in FIG. 2 are a plurality of throughholes 135, which penetrate the thickness of circuit board 130. Throughholes 135 are plated with an electrically conductive material, allowing electrical continuity between the traces on top surface 132 and bottom surface 134 of circuit board 130.

The electrical components mounted to circuit board 130 can be mounted in conventional ways, known to those of ordinary skill in the art, including, but not limited to, soldering, clinching, or using an adhesive. In the embodiment shown in FIG. 2, there are three components mounted to circuit board 130: LED 140, resistor 150, and cable wires 162, 164. LED leads 144 of LED 140 penetrate the length of throughholes 135 and are soldered to bottom surface 134 of circuit board 130. Similarly, cable wires 162, 164 penetrate throughholes 135 of circuit board 130 and are soldered to top surface 132 of circuit board 130. Also mounted to circuit board 130 is resistor 150, which is mounted to bottom surface 134 of circuit board 130. In the embodiment shown, resistor 150 is a surface-mounted resistor. Cable wires 162, 164, can alternately be mounted directly onto bottom surface 134 of circuit board 130, LED 140 can be mounted directly onto top surface 132 of circuit board 130, and/or resistor 150 can be mounted to top surface 132 of circuit board 130 and situated between LED 140 and circuit board 130. However, throughholes 135 or another way of providing electrical continuity between top surface 132 and bottom surface 134 of circuit board 130 known to those of ordinary skill in the art would still be necessary in any embodiment in which all of the components are not mounted to the same side of circuit board 130. For example, in an embodiment in which LED 140 is mounted to top surface 132 of circuit board 130 and resistor 150 and cable wires 162, 164 are mounted to bottom surface 134 of circuit board 130, throughholes 135 are plugged with solder which still allows for electrical continuity between all of the electrical components. In another alternate embodiment, cable wires 162, 164 penetrate throughholes 135 and are mounted to top surface 132 of circuit board 130, and LED 140 and resistor 150 are also mounted to top surface 132 of circuit board 130, making electrical continuity between top and bottom surfaces 132, 134 or circuit board 130 unnecessary.

LED 140, comprised of LED leads 144 and dome 149, can also be seen in FIG. 2. LED 140 in the embodiment shown is a "Superflux" LED, well known to those of ordinary skill in the art, but could be another commercially available LED. Although not visible from this perspective, there are four (4) LED leads 144, which, because LED 140 is generally square, provides for a stable mount. Leads 144 are soldered to circuit board 130, but could be clinched or attached using an adhesive. In an alternate embodiment of vehicle mini lamp 100, a surface mounted LED is employed, which does not have the leads, but produces vehicle mini lamp 100 with a slightly shorter profile. However, use of the Superflux LED, with leads 144 creates a gap between LED 140 and circuit board 130, which helps facilitate heat dissipation and permits the potting compound (discussed infra) to fit between LED 140 and circuit board 130 for a more secure attachment.

Also visible in the embodiment of vehicle mini lamp 100 shown in FIG. 2 is resistor 150 to control current to LED 140 and is mounted to bottom surface 134 of circuit board 130. In operation, resistor 150 generates heat. Resistor 150 is therefore mounted to bottom surface 134 of circuit board 130 to facilitate heat dissipation. However, as included supra, resistor 150 could also be mounted to top surface 132 of circuit board 130, between circuit board 130 and LED 140. In the embodiment shown in FIG. 2, resistor 150 is a 0.5 Watt surface mount, readily available. However, one of ordinary skill in the art will recognize that other resistors could be used, as long as they have a similarly small profile. The exact resistor will depend on the power supply and the LED bin that is used.

Figure 3A:
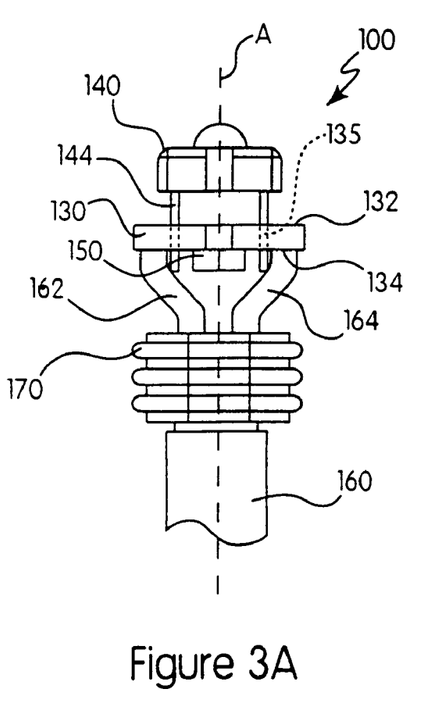
FIGS. 3A and 3B show cross-sectional views of one embodiment of the electrical components of the vehicle mini lamp according to the present invention.
Figure 3B:
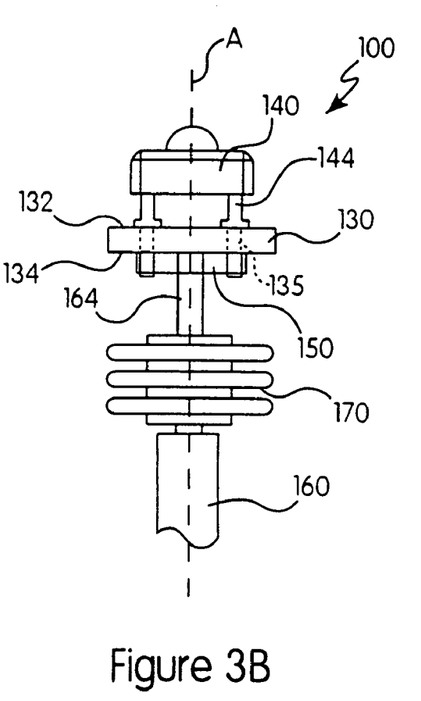

FIGS. 3A and 3B show cross-sectional, side perspective views of the embodiment of the electrical components of vehicle mini lamp 100 as shown in FIG. 2, in which the electrical components have been assembled. FIG. 3A is from one side and FIG. 3B is from a perspective in which vehicle mini lamp 100 has been turned ninety degrees (90°) about axis A. As can be appreciated, LED leads 144 penetrate through circuit board 130 via throughholes 135 and are soldered to bottom surface 134 of circuit board 130, and resistor 150 is mounted to bottom surface 134 of circuit board 130.

Referring again to FIG. 2, cable 160, cable wires 162, 164, and cable seal 170 can all be appreciated. In the embodiment shown, cable 160 is a two-conductor cable, comprised of cable wires 162, 164, which is inserted through lower end 112 of housing 110 and cable seal 170. Cable wires 162, 164 are then electrically connected to circuit board 130, as discussed supra. When assembled, cable seal 170 is situated within the narrow portion of the bore within housing 110. The embodiment of cable seal 170 shown in FIG. 2 is comprised of three (3) flanges 173, which aid in creating an air and water-tight seal with housing 110, and define the bottom surface of cavity 99 within housing 110. In the embodiment shown, cable seal 170 is made of silicone, but can alternately be made of PVC, Teflon, or any comparable material. End portion 119 of housing 110, in the embodiment shown in FIG. 2, is thicker than the remainder of housing, making lower end 112 of housing 110 of a lesser diameter than the rest of the housing bore to prevent cable seal 170 from disengaging housing 110.

Figure 4:
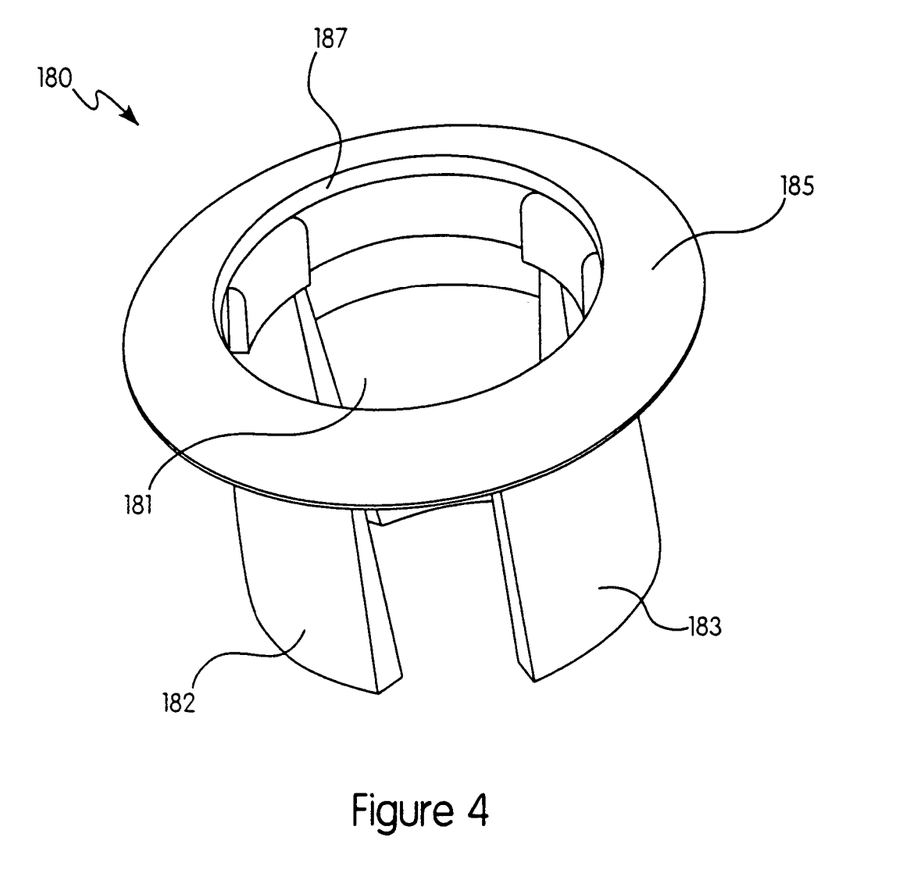
FIG. 4 shows a top perspective view of one embodiment of an attachment member as used in the present invention.

FIG. 4 shows a top perspective view of one embodiment of an attachment member 180 of vehicle mini lamp 100. As used herein, the term "attachment member" refers to any element used to secure, permanently or non-permanently, vehicle mini lamp 100 to mounting structure 190, including but not limited to a flange, a grommet, or any other rigid or flexible material.

As can be seen, in the embodiment shown attachment member 180 may be, but is not limited to, a flange. Attachment member 180 has three legs 181, 182, and 183, and is flush with and fixedly secures the vehicle mini lamp 100 (not shown) within the mounting structure 190 (not shown). The use of three legs 181, 182, and 183 is exemplary only and not intended to be limiting. This implies that, any number of legs can be used that secure attachment member 180 and the vehicle mini lamp to mounting structure 190. In the embodiment shown, attachment member 180 has a sleeve portion 185 with an open top end. Sleeve portion 185 is further comprised of a recess 187 adapted to receive, in part, the lens (not shown) and sleeve portion 185 is generally arcuate as will be discussed infra. Attachment member 180 is made of nylon or another material with similar flexibility. Attachment member 180 secures vehicle mini lamp 100 to mounting structure 190 to prevent vehicle mini lamp 100 from being removed once installed, i.e., theft-resistant. Attachment member 180, in the embodiment shown, is made of nylon, but could also be made of polycarbonate, another thermoplastic, or another material of similar properties and characteristics. Although not depicted in FIG. 4, vehicle mini lamp could further include a gasket between attachment member 180 and mounting structure 190 to provide a water-tight seal.

In alternate embodiments of vehicle mini lamp 100, vehicle mini lamp 100 is secured to mounting structure 190 by glue, a fastener, or a snap. In an embodiment in which attachment member 180 is a grommet, the grommet functions the same as attachment member 180 in that it provides a structure for mounting vehicle mini lamp 100 to mounting structure 190, but does so in a more temporary way so that vehicle mini lamp 100 can be easily removed and replaced. The grommet is typically made of PVC plastic, but can alternately be made of any material with comparable properties.

Figure 5:
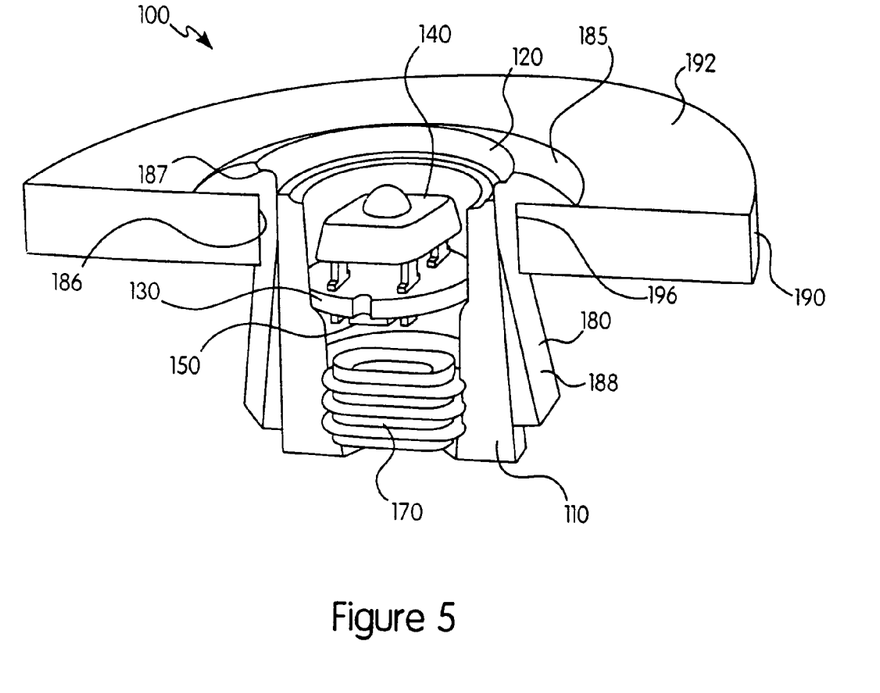
FIG. 5 shows a top perspective view of the vehicle mini lamp with some of the electrical components assembled within the housing according to one embodiment of the invention.

FIG. 5 shows a top perspective view of vehicle mini lamp 100, in which the electrical components are assembled within housing 110 and further including attachment member 180. As can be appreciated, recess 187 in sleeve portion 185 of attachment member 180 allows lens 120 to be flush with attachment member 180 when vehicle mini lamp 100 is set within aperture 196 of mounting structure 190. FIG. 5 also shows housing 110, lens 120, circuit board 130, LED 140, resistor 150, cable seal 170, and attachment member 180. Furthermore, in the embodiment shown in FIG. 5, sleeve portion 185 of attachment member 180 is wider than aperture 196 of mounting structure 190 and slightly arcuate so that vehicle mini lamp 100 is generally flush with surface 192 of mounting structure 190 (discussed in greater detail infra) into which it is set, creating a low profile. Also visible in the embodiment of attachment member 180 shown in FIG. 5 is side recess 186. Side recess 186 is of a length that is the same as mounting structure 190 is thick. Also visible is an open bottom end 188. Open bottom end 188 is of a thickness that is slightly wider than aperture 196 of mounting structure 190, so that when vehicle mini lamp 100 is positioned within aperture 196 of mounting structure 190, the combination of side recess 186, open bottom end 188, and open top end 185 secures vehicle mini lamp 100 within aperture 196 of mounting structure 190.

Figure 6:
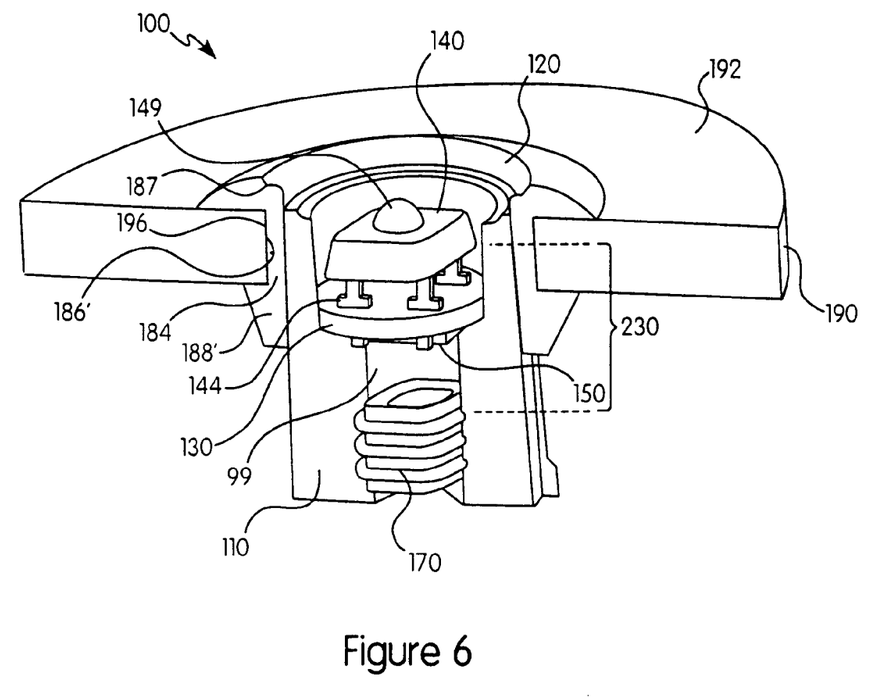
FIG. 6 shows a top perspective view of the vehicle mini lamp with some of the electrical components assembled within the housing and an alternate embodiment of the flange according to an alternate embodiment of the vehicle mini lamp.

FIG. 6 shows a top perspective view of an alternate embodiment of vehicle mini lamp 100 in which, like FIG. 5, housing 110, lens 120, circuit board 130, LED 140, resistor 150, cable seal 170, and rail can all be seen. However, FIG. 6 shows an alternate embodiment of vehicle mini lamp 100 in which flange is grommet 184. Grommet 184 also uses recess 186' to secure vehicle mini lamp 100 within aperture 196 of mounting structure 190, and grommet base 188' is shaped differently from that of open bottom end 188 as shown in FIG. 5, but still prevents moisture from entering vehicle mini lamp 100.

Also shown in FIG. 6 is the volume in which potting compound 230 is disposed within cavity 99 of housing 110. In one embodiment, potting compound 230 completely encases resistor 150, circuit board 130, that part of the cable wires (not shown), that are within cavity 99 and part of LED 140, fully encapsulating all of the electrical components (except part of LED 140) and all of the electrically active areas. Potting compound 230 is also in the area between circuit board 130 and cable seal 170. However, potting compound 230 only partially encapsulates LED 140, such that LED leads 144 are encapsulated, but dome 149 is not covered by potting compound 230 as this could affect the amount of light emitted from vehicle mini lamp 100. In an alternate embodiment, potting compound 230 does not encase the electrical components, but only the electrical connections between the electrical components. Two examples of potting compound 230 are Resin ER 1005 LV, manufactured by Star Technology, Inc™ and a two-part potting compound which combines Resin E-285-1A with Hardener E-285-1B, which cures when exposed to UV light, also manufactured by Star Technology, Inc.™.

Potting compound 230 provides a heat sink to vehicle mini lamp 100 and withdraws thermal energy directly away from LED 140. Potting compound 230 further provides protection for the electrical components, i.e., LED 140, circuit board 130, resistor 150, and the wires from vibration, fatigue, and moisture.

For the purpose of describing the method of assembling vehicle mini lamp 100, FIG. 2 will again be referred to. One of ordinary skill in the art will realize, however, that unless otherwise noted, the steps need not be followed in any specific order and that additional steps may be added. The addition of further steps as well as performing the steps in the formation of vehicle mini lamp 100 in alternate orders are intended to be within the spirit and scope of the invention.

The first step in the formation of vehicle mini lamp 100 is to attach the electrical components to the circuit board. Leads 144 of LED 140 are soldered or otherwise electrically connected to circuit board 130, whether to top surface 132 or first passed through throughholes 135 and then soldered to bottom surface 134 of circuit board 130. Resistor 150 is also soldered to circuit board 130. In an embodiment in which resistor 150 is electrically connected to bottom surface 134 of circuit board 130, resistor 150 can be electrically connected to circuit board 130 either before or after LED 140 is electrically affixed to circuit board 130. However, in an embodiment in which resistor 150 is electrically affixed to top surface 132 of circuit board 130, resistor 150 should be affixed before LED 140 is affixed for ease of assembly. Cable wires 162, 164, further comprised of cable seal 170 and cable 160 (as in the embodiment shown in FIG. 2) are also soldered or otherwise electrically connected to circuit board 130, whether directly to bottom surface 134 or to top surface 132 after first passing through throughholes 135.

The electrical components, i.e. circuit board 130, LED 140, resistor 150, and cable wires 162, 164, are then positioned within housing 110. In the embodiment shown, circuit board 130 is positioned to rest on ledge 115 of housing 110. In an embodiment in which housing has a tapered inner surface 113, circuit board 130 is positioned within housing 110 such that it is snugly disposed therein. Cable seal 170 is also positioned within housing 110, but within a lower portion of housing 110 such that it is substantially disposed substantially adjacent to lower end 112 of housing. Cable seal 170, along with housing 110 form cavity 99.

Potting compound 230 (not shown in FIG. 2) is then injected into cavity 99 and allowed to cure. As discussed supra, only enough potting compound 230 is disposed within cavity 99 to encase the electrical components and form a seal with cable seal 170, but not fully encapsulate LED 140 or the area between LED 140 and lens 120. When allowed to cure, potting compound 230 encapsulates circuit board 130, resistor 150, that portion of cable wire 162, 164 between cable seal 170 and circuit board 130, all electrical connections, and part of LED 140, including leads 144, but not dome 149, so as not to affect the light emitted from LED 140.

Lens 120 is affixed to housing 110 via means provided supra. In an embodiment of vehicle mini lamp 100 in which top surface 185 of attachment member 180 further has recess 187 disposed thereon, attachment member 180 is placed over and around housing 110 before affixing lens 120 to housing 110 or to housing 110 and attachment member 180.

Figure 7:
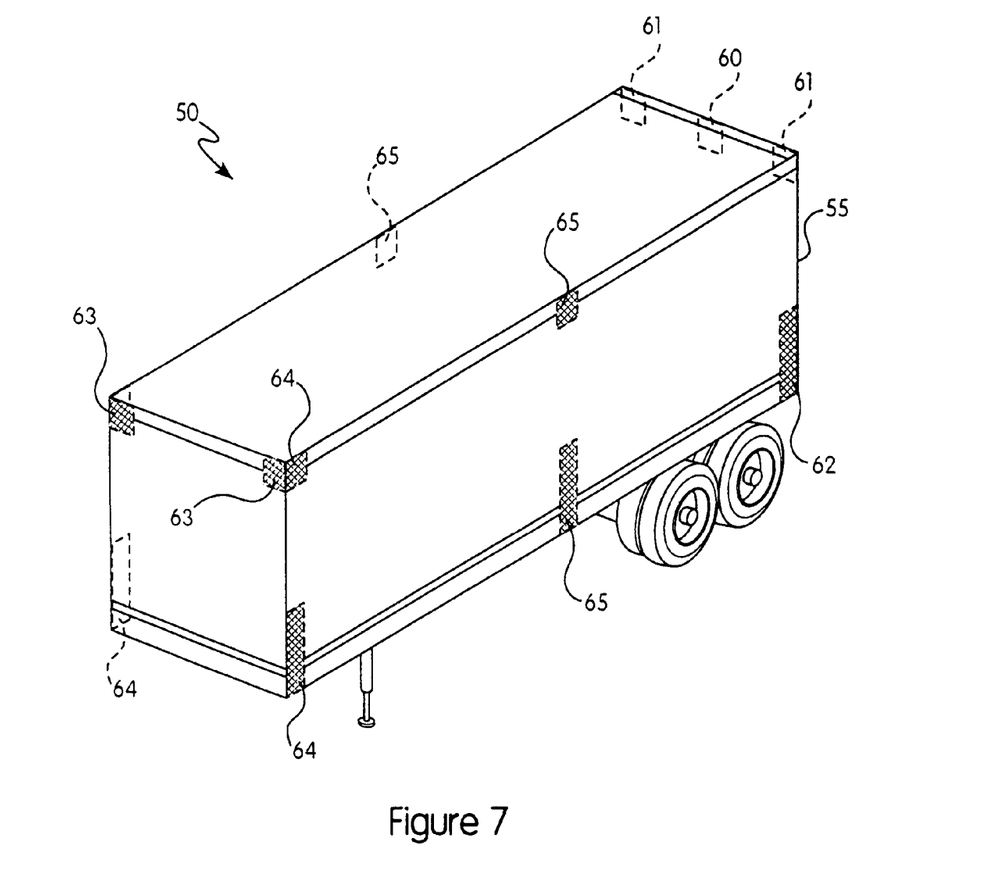
FIG. 7 shows some of the various possible positions on a vehicle where the vehicle mini lamp can be positioned.

Vehicle mini lamp 100 is intended to be used alone, in combination with other vehicle mini lamps 100, or in combination with other lamps of other sorts. In addition, vehicle mini lamp 100 can emit red light, yellow-amber light, or any other color light, depending on the position on vehicle 50. In order to achieve a desired color (i.e., red, yellow-amber, white, or other), lens 120 can be colored, LED 140 can be colored, or a combination of the two. FIG. 7 shows some of the various possible positions on vehicle 50 where vehicle mini lamp 100 could be positioned: as rear identification lamp 60 (as shown in FIG. 1), as rear clearance lamps 61, as rear side marker lamps 62, as front clearance lamps 63, as front side marker lamps 64, and as intermediate side marker lamps 65. As is required by the SAE standards and federal law as provided supra, identification lamps 60, rear clearance lamps 61, and rear side marker lamps 62 must be red, and front clearance lamps 63, front side marker lamps 64, and intermediate side marker lamps 65 must be yellow amber.

A single vehicle mini lamp 100 can be positioned at any particular location on vehicle 50 as shown in FIG. 7 or other locations, or a set of vehicle mini lamps 100 can be used to satisfy the lighting requirements. For example, identification lamps 60 of FIG. 1 are three (3) vehicle mini lamps mounted on mounting structure 190, equally spaced apart from one another and adapted to be affixed to vehicle 50 at the position shown in FIGS. 1 and 7.

Figure 8A:
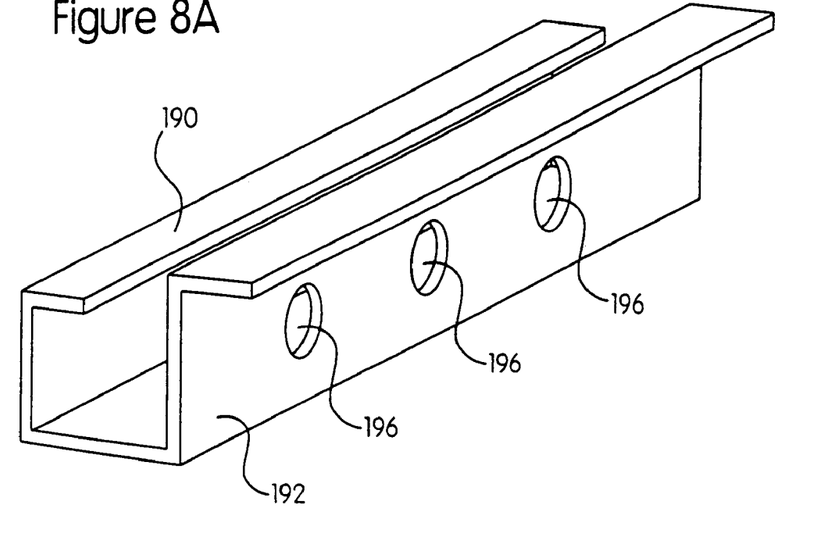
FIG. 8A shows a top perspective view of one embodiment of a mounting structure on which the vehicle mini lamp is mounted in a vehicle mini lamp system.

FIG. 8A shows a top perspective view of one embodiment of mounting structure 190, on which vehicle mini lamp 100 is mounted in a vehicle mini lamp system. Mounting structure 190 is comprised of three (3) apertures 196, each adapted to receive one vehicle mini lamp 100. One alternate embodiment of mounting structure 190 has five (5) apertures 196 and corresponding vehicle mini lamps 100, equally spaced apart, as is required for identification lamp 60 in Canada. Still another embodiment of mounting structure 190 also has five (5) apertures 196 and corresponding vehicle mini lamps 100, but instead of having five (5) apertures 196 and five (5) corresponding vehicle mini lamps 100 functioning as identification lamp 60, mounting structure 190 is the entire width of vehicle 50, with three (3) apertures 196 and corresponding vehicle mini lamps 100 functioning as identification lamp 60 and the two (2) outermost apertures 196 and corresponding vehicle mini lamps 100 functioning as rear clearance lamps 61. Mounting structure 190 can be made of any material which provides adequate durability and corrosion-resistance and is structurally sound. For example, mounting structure 190 can be made of metal (e.g., aluminum or A36 steel), plastic, wood, or fiberglass.

Figure 8B:
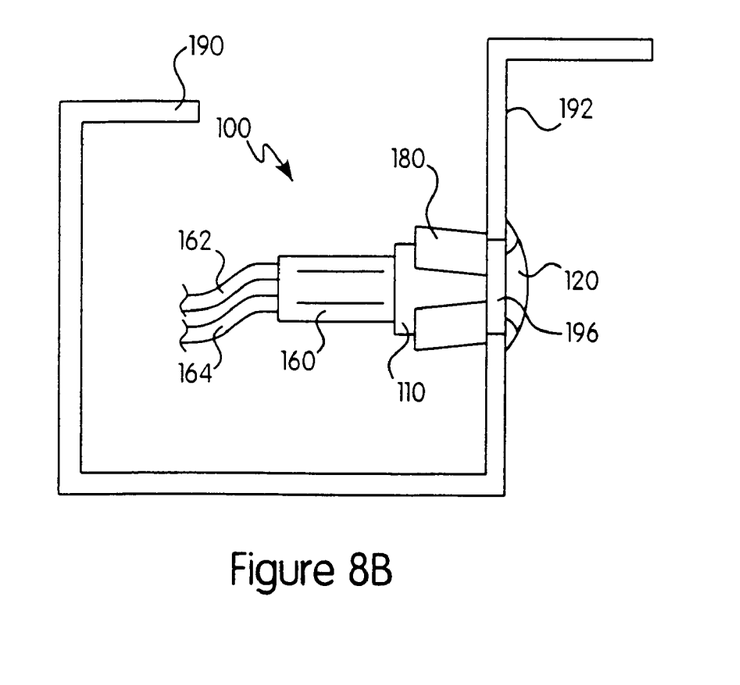
FIG. 8B shows a side cross-sectional view of one embodiment of a mounting structure with one vehicle mini lamp affixed thereto.

FIG. 8B shows a side cross-sectional view of one embodiment of mounting structure 190 with one (1) vehicle mini lamp 100 affixed thereto according to one embodiment of the invention. Lens 120, attachment member 180, housing 110, cable 160, and cable wires 162, 164 of vehicle mini lamp 100 can all be appreciated, as well as aperture 196 of mounting structure 190. As can be seen, recess (catch member) 186 in attachment member 180 corresponds with the thickness of mounting structure 190 so that there is a tight sealed junction between vehicle mini lamp 100 and mounting structure 190. In another embodiment, vehicle mini lamp 100 is secured to mounting structure 190 with a clamp or similar securing device to prevent theft or unauthorized removal of lamp 100. Details pertaining to this embodiment have been explained in conjunction with FIGS. 10 and 11.

For the other lamps on vehicle 50, other types of mounting structures 190 may be required. For example, an adapter plate or mounting bracket designed for a flat or slightly curved surface may be necessary.

Figure 9:
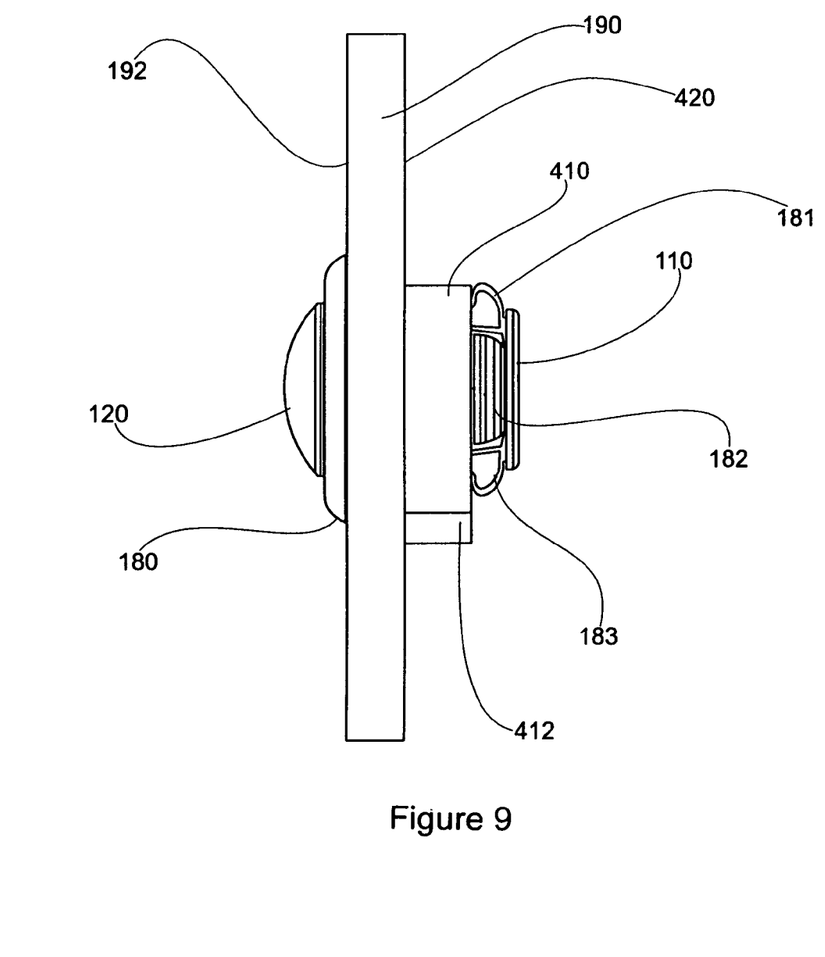
FIG. 9 shows a side view of one embodiment of an anti-theft vehicle mini lamp.

FIG. 9 shows a side view of one embodiment of a vehicle mini lamp 100, which, in the embodiment shown, includes housing 110 with lens 120, attachment member 180, and a clamp 410 for securing lamp 100 to mounting structure 190. Clamp 410 or a similar securing device prevents vehicle mini lamp 100 from being removed through front face 192 of mounting structure 190.

Clamp 410 is positioned between a back surface 420 of mounting structure 190 and the leg elements of attachment member 180. Clamp 410 engages attachment member 180 to prevent removal of lamp 100. In one embodiment, clamp 410 includes an ear 412 for crimping clamp 410 to legs 181, 182, and 183 of attachment member 180. Details pertaining to clamp 410 have been explained in conjunction with FIG 10. In another embodiment, clamp 410 may include a plurality of ears 412 for crimping clamp 410 to attachment member 180.

Figure 10:
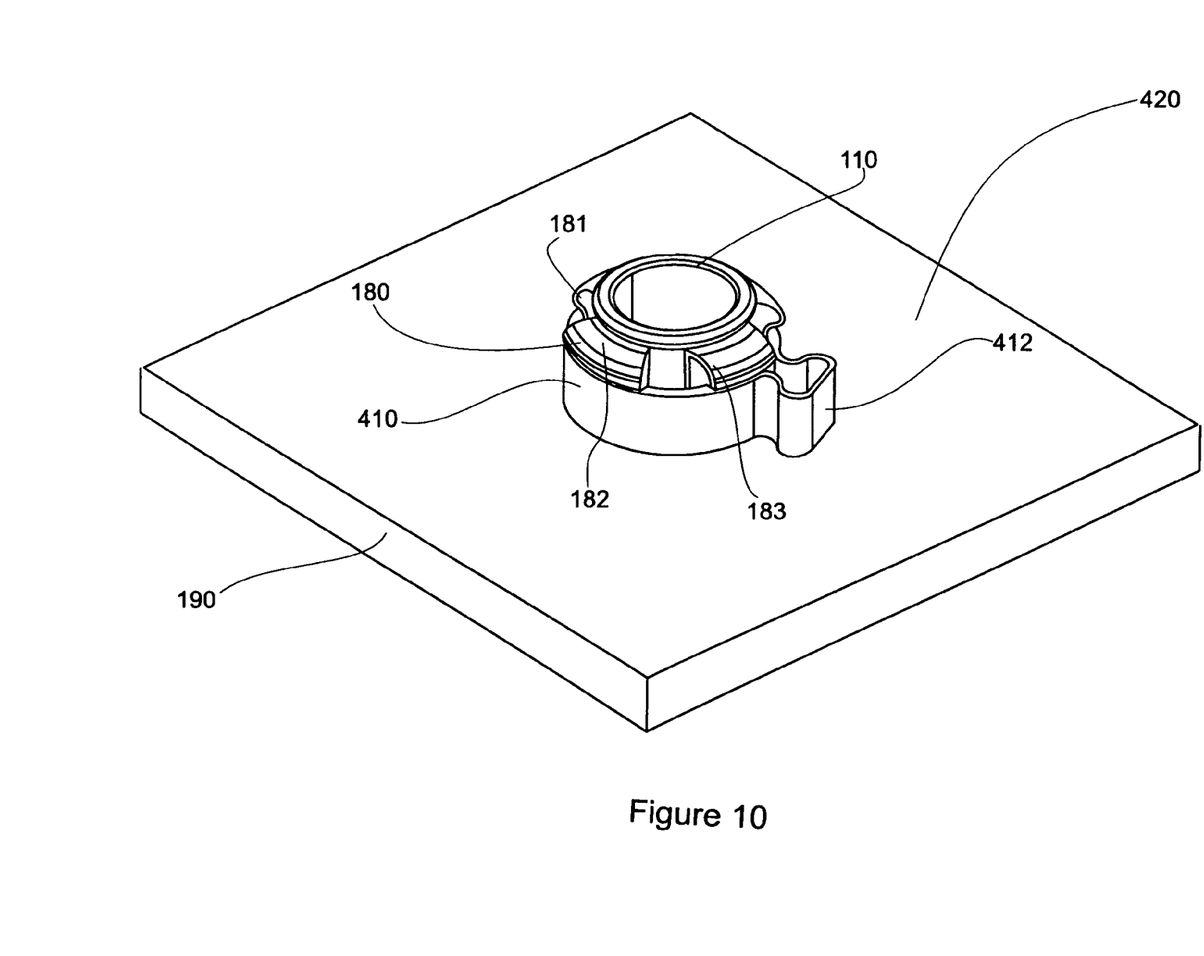
FIG. 10 shows a rear isometric view of one embodiment of the anti-theft vehicle mini lamp as shown in FIG. 10.

FIG. 10 illustrates a rear isometric view of one embodiment of vehicle mini lamp 100. Ear 412 is crimped to compress clamp 410 about attachment member legs 181, 182, and 183 to secure vehicle mini lamp 100 to mounting structure 190. Ear 412 is a U-shaped member that extends outwardly from clamp 410, which may be crimped with a conventional crimping tool. The crimping of ear 412 may be adjusted for securing housing 110 and to prevent vehicle mini lamp 100 from being removed from mounting structure 190. Examples of clamp 410 may include, but are not limited to, a compression clamp, an ear clamp, wire rope clamp, bench clamp, magnetic clamp and cord clamp.

Figure 11A:
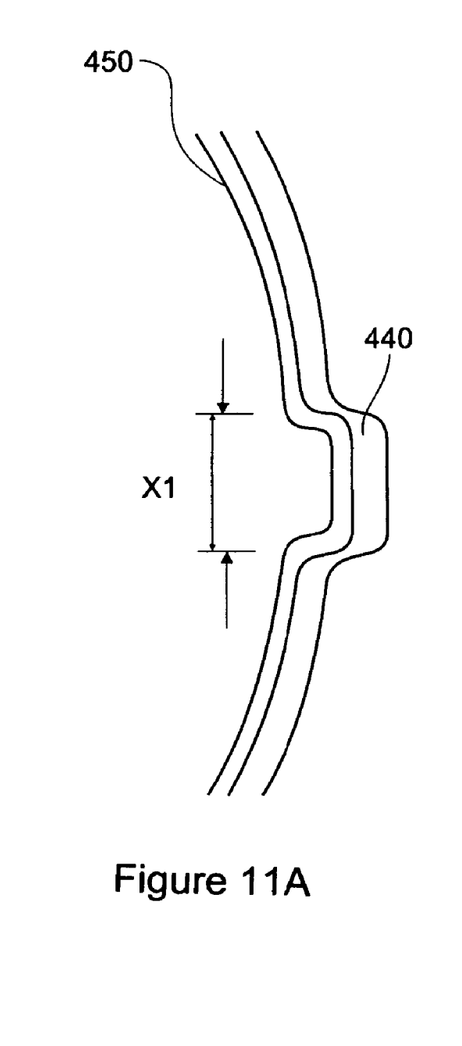
FIGS. 11a and 11b show crimping of a clamp of the anti-theft vehicle mini lamp.
Figure 11B:
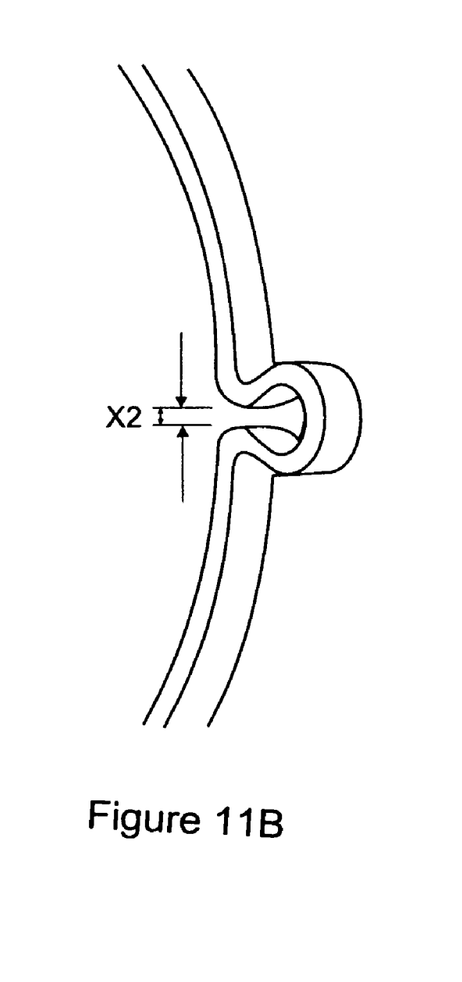

FIG. 11a and 11b shows crimping of clamp 410 which, in the embodiment shown, is crimped to reduce the width of ear 412. A force is applied on ear 412 to reduce the width from an initial width X1 to a final width X2 as shown in the FIG. 11a and 11b, respectively. In one embodiment, the force may be applied using a crimping tool. Example of the crimping tool may include, but are not limited to pliers, pincers and the like.

Figure 12:
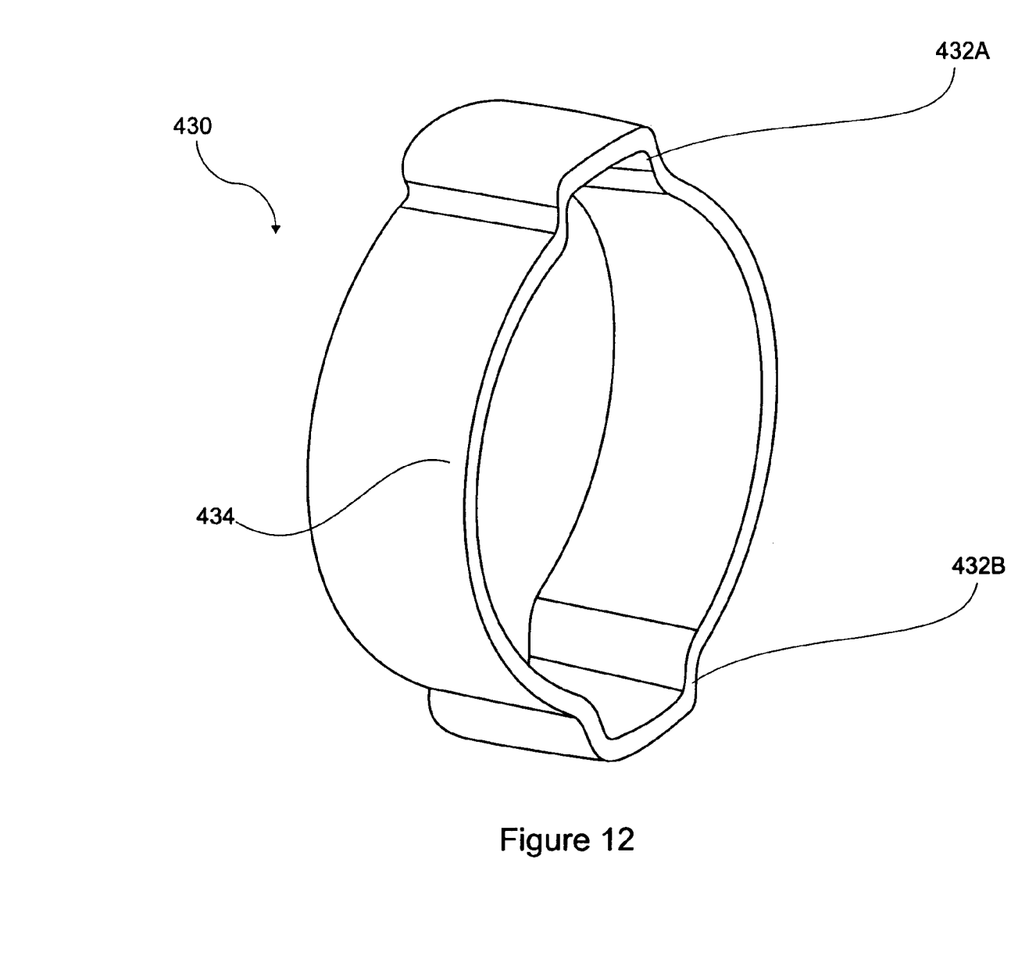
FIG. 12 shows an alternate embodiment of a clamp of the anti-theft vehicle mini lamp.

FIG. 12 shows one embodiment of a compression clamp 430 of vehicle mini lamp 100 which, in the embodiment shown, includes two ears, 432a and 432b, and a ring 434. Ears 432a 432b maybe crimped to adjust the circumference of ring 434, thereby securing lamp 100 within mounting structure 190.

Various elements shown in FIG. 9 to FIG. 11, to the extent that they are similar to corresponding elements in the embodiments of vehicle mini lamp 100 of FIG. 1 to FIG. 89, are designated with the same reference numerals.

Although, for convenience, the invention has been described primarily with reference to several specific embodiments, it will be apparent to those of ordinary skill in the art that the lamp and the components thereof can be modified without departing from the spirit and scope of the invention as claimed.

The invention claimed is:

1. A vehicle lamp assembly comprising:
   a housing having a top end, a body portion with an interior portion, a lens portion covering said top end;
   circuitry disposed within said interior portion of the housing;
   at least one light source being electrically connected to said circuitry;
   an attachment member having a sleeve portion with an open top end and an open bottom end, said sleeve portion having a plurality of legs, said sleeve portion being adapted to receive said body portion of said housing and to fit within an opening in a vehicle surface such that said lens portion of said housing is substantially flush with an outer face of said vehicle surface and said body portion of said housing is positioned substantially behind said vehicle surface; and
   a securing device positioned between a back face of said vehicle surface and said plurality of legs of said attachment member, wherein said securing device prevents said attachment member and housing from being removed from said vehicle surface.

2. The vehicle lamp of claim 1, wherein said body portion of said housing includes a cylindrical sidewall.

3. The vehicle lamp of claim 1, wherein said attachment member includes an upper rim surface extending outwardly from said sleeve portion adjacent to said open top end such that said upper rim surface is substantially flush with said lens portion of said housing.

4. The vehicle lamp of claim 3, wherein said upper rim surface of said attachment member is arcuate and said lens portion is generally arcuate to form a generally flush surface.

5. The vehicle lamp of claim 1, wherein said vehicle lamp is adapted for use as a clearance lamp, a side marker lamp, or an identification lamp.

6. The vehicle lamp of claim 1, wherein said securing device is selected from the group consisting of: a compression clamp, an ear clamp, a wire rope clamp, a bench clamp, a magnetic clamp and a cord clamp.

7. The vehicle lamp of claim 6, wherein said securing device is a compression clamp.

8. The vehicle lamp assembly of claim 1 wherein said vehicle surface is a mounting structure having a first wall, a second wall and a third wall, said second and third walls extending perpendicularly from said first wall and being spaced apart to define a channel therebetween, said first wall having an aperture adapted to receive said attachment member wherein said mounting structure protects said vehicle lamp from damage and wherein said securing device prevents said vehicle lamp from being removed from said mounting structure.

9. The vehicle lamp of claim 1, wherein said vehicle surface is a vehicle wall and said securing device prevents said vehicle lamp from being removed from outside said vehicle wall.

10. The vehicle lamp of claim 1, wherein said lens is selected from a group consisting of: a red lens, emitting a generally red light from said vehicle lamp, a yellow-amber lens, emitting a generally yellow-amber light from said vehicle lamp, or a clear lens and said at least one light source emits red light, emitting red light from said vehicle lamp, or said at least one light source emits yellow-amber light, emitting yellow-amber light from said vehicle lamp.

11. The vehicle lamp of claim 1, wherein said securing device includes one or more crimpable ear portions.

12. The vehicle lamp of claim 1, wherein said attachment member is formed from a flexible material.

13. The vehicle lamp of claim 1 wherein each of said legs to said attachment member includes a portion that overhangs said securing device.

14. The vehicle lamp of claim 13 wherein the portion of said legs that overhangs said securing device is hollow.

15. A method for assembling an anti-theft vehicle mini lamp comprising the steps of:
   providing a lamp housing having a top end, a body portion with an interior portion, a lens portion covering said top end, and a light source fixed to a circuit board within said interior portion;
   providing an attachment member having a sleeve portion with an open top end and an open bottom end, said sleeve portion having a plurality of legs, said sleeve portion being adapted to receive said body of said lamp housing and to fit within an opening in a vehicle surface;
   positioning said lamp housing within an attachment member;
   positioning a clamp against a back face of said opening in said surface;
   pushing said attachment member and said lamp housing into said opening in said surface such that said plurality of legs engage said clamp, thereby securing said attachment member and lamp housing within said vehicle surface.

16. The method of claim 15, wherein said clamp has at least one crimpable ear and said method further comprises:
   crimping said ear of said clamp.

17. The method according to claim 15, wherein said attachment member includes an upper rim surface extending outwardly from said open top end and being substantially flush with an upper surface of said lens portion, said attachment member being adapted to attach said vehicle lamp to a vehicle such that said vehicle lamp has a low profile in relation to said vehicle surface.

18. The method according to claim 17, wherein said upper rim surface of said attachment member is arcuate and said lens portion is generally arcuate to form a generally flush surface.

19. The method according to claim 15, wherein said vehicle lamp is adapted for use as a clearance lamp, a side marker lamp, or an identification lamp.

20. The method according to claim 15, wherein said clamp is a compression clamp.

* * * * *

UNITED STATES PATENT AND TRADEMARK OFFICE
CERTIFICATE OF CORRECTION

PATENT NO. : 7,572,043 B2  Page 1 of 1
APPLICATION NO. : 11/983667
DATED : August 11, 2009
INVENTOR(S) : Todd Kolstee et al.

It is certified that error appears in the above-identified patent and that said Letters Patent is hereby corrected as shown below:

Title Page, Item (73) change "Flacomer" to --Falconer--.

Signed and Sealed this

Twenty-second Day of September, 2009

David J. Kappos
*Director of the United States Patent and Trademark Office*